United States Patent [19]

Watanabe

[11] Patent Number: 4,798,941

[45] Date of Patent: Jan. 17, 1989

[54] IC CARD

[75] Inventor: Hiroshi Watanabe, Kokubunji, Japan

[73] Assignee: 501 Toppan Moore Company, Ltd., Tokyo, Japan

[21] Appl. No.: 932,212

[22] PCT Filed: Mar. 13, 1986

[86] PCT No.: PCT/JP86/00126
§ 371 Date: Oct. 24, 1986
§ 102(e) Date: Oct. 24, 1986

[87] PCT Pub. No.: WO86/05613
PCT Pub. Date: Sep. 25, 1986

[30] Foreign Application Priority Data

Mar. 14, 1985 [JP] Japan .................. 60-51015

[51] Int. Cl.$^4$ .............................. G06K 5/00
[52] U.S. Cl. ............................ 235/380; 235/492
[58] Field of Search ........................... 235/380, 492

[56] References Cited

U.S. PATENT DOCUMENTS 4,105,156 8/1978 Dethloff .................. 235/441
4,295,041 10/1981 Ugon .
4,408,119 10/1983 Decavele .
4,442,345 4/1984 Moller .................. 235/380

FOREIGN PATENT DOCUMENTS 2471003 11/1979 France .
2513408 9/1981 France .
61-139876 6/1986 Japan .

Primary Examiner—Harold I. Pitts
Attorney, Agent, or Firm—Kenyon & Kenyon

[57] ABSTRACT

There is provided an IC card having control means (1) and storage means (4), wherein storage means (4) comprises a storage area for storing information thereon, a secret identification number area for storing a predetermined secret identification number thereon, and an error count area for storing the number of times of improper input of the secret identification number, and wherein the control means (1) comprises comparison means (107, 112) for comparing a supplied secret identification number with the predetermined secret identification number stored on the secret identification number area, means (108, 113) for accessing to the storage area when the comparison means indicates coincidence as a result of comparison, error count means (120 to 126) for storing the number of times of discrepancy into the error count area when the comparison means indicates discrepancy as a result of comparison, storage area lock means (102, 104) for inhibiting access to the storage area when the error count means has counted a predetermined number of times, and reset means (151, 152, FIGS. 9A and 15) for invalidating the count of the error count area on the basis of the specific input signal.

13 Claims, 14 Drawing Sheets

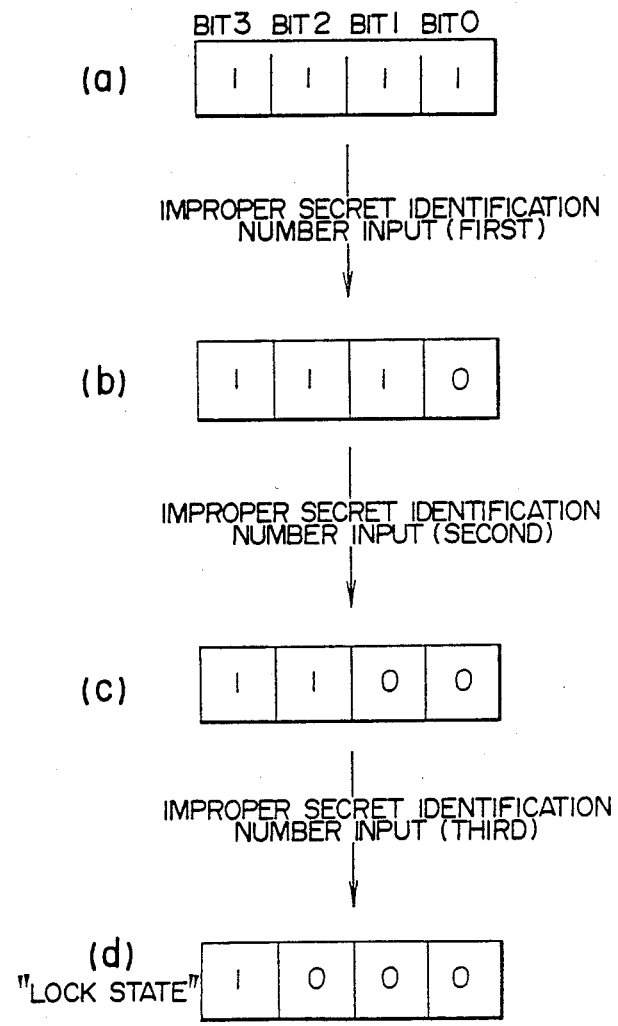

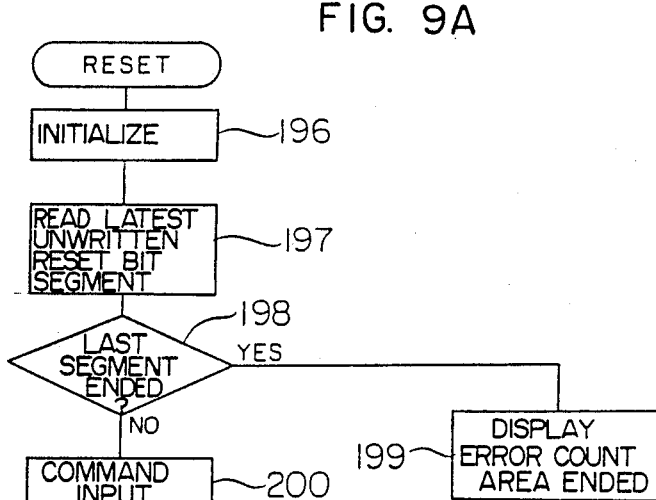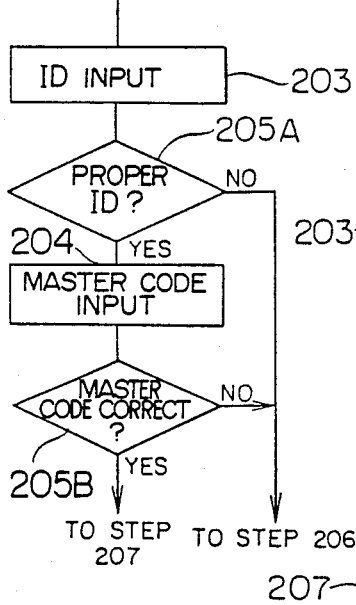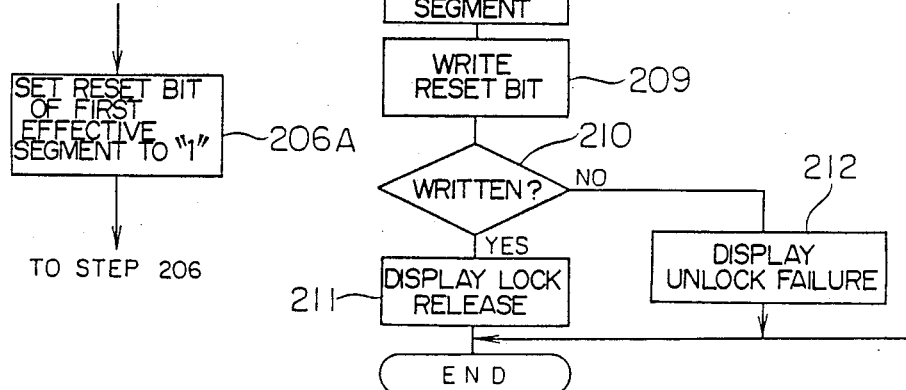

FIG. 10A
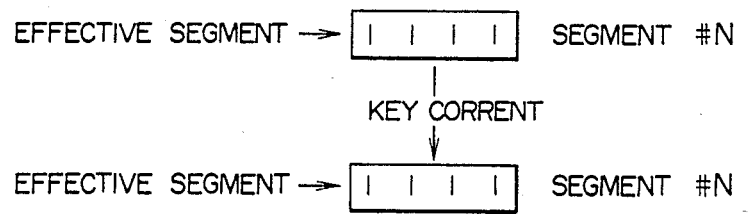
FIG. 10B
FIG. 10C
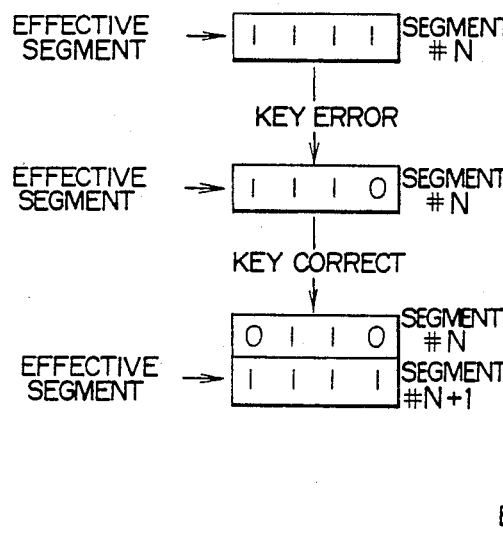
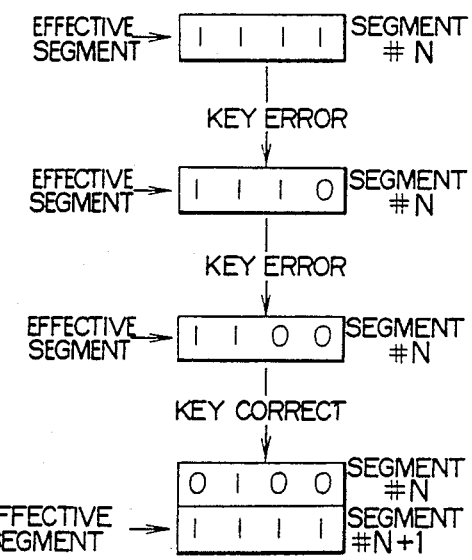

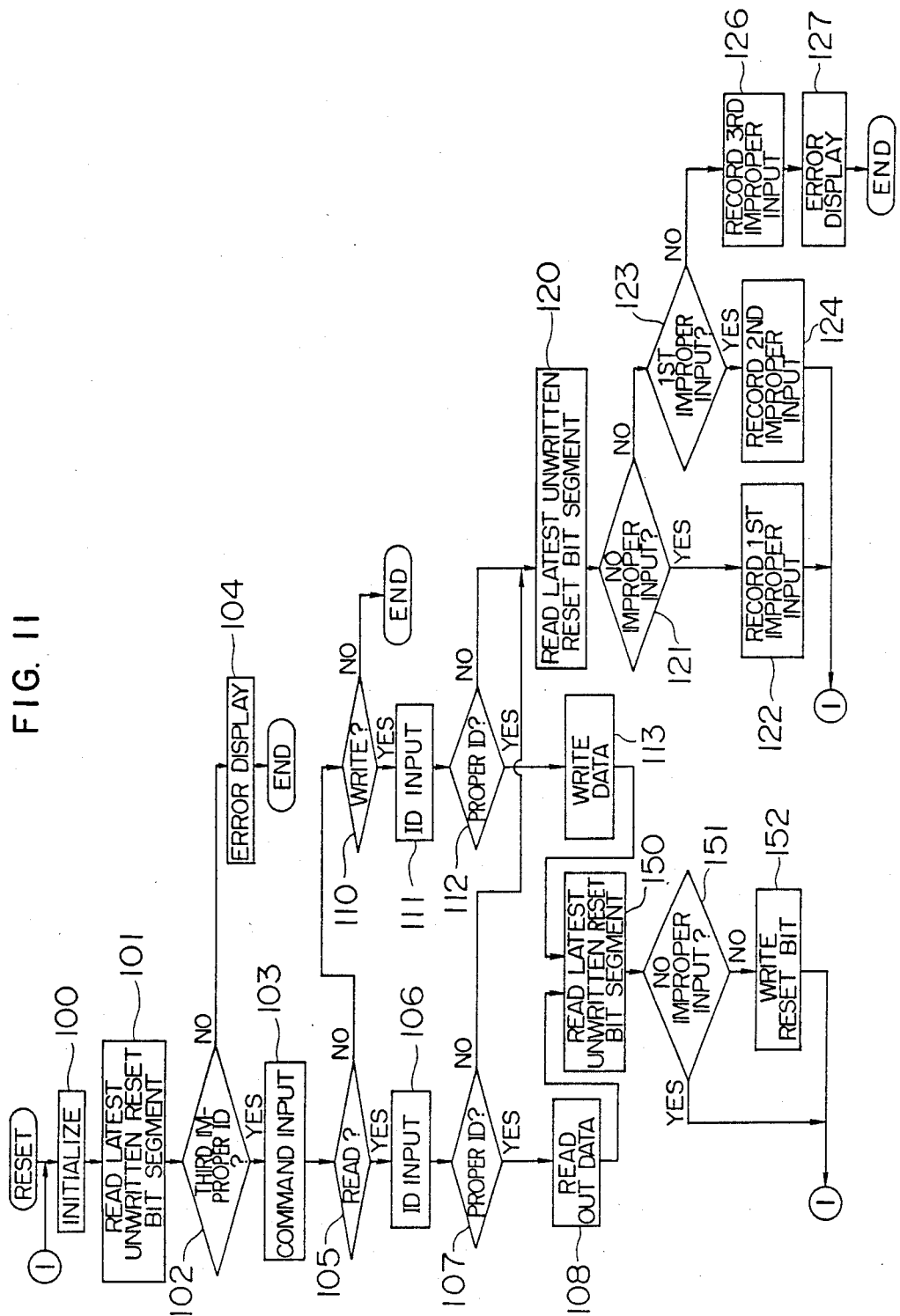

IC CARD

TECHNICAL FIELD

The present invention relates to an IC card and in particular to an IC card whereby data access is restricted when improper secret identification numbers are supplied a predetermined times and the restriction can be canceled thereafter. IC cards according to the present invention include not only flat cards but also key shaped or sticklike cards. The term "secret identification number" herein refers to a particular input signal used to access the IC card and includes codes referred to as key codes or secret codes.

BACKGROUND ART

It is common in use of credit cards or identification cards that a secret identification number is supplied to confirm the identity of the card holder and the access to the information is allowed only when the proper number is supplied.

When an IC card proposed to maintain secrecy of the secret identification number is used, the allowed number of times of improper number input attempts is limited, and the card is so locked as not to be used when improper numbers are supplied predetermined times.

However, it is not desirable to disable the use of the IC card (i.e., to destroy its memory) when the secret identification number has been improperly supplied predetermined times, because it may have been caused by a mistake of the card holder, for example.

Alternatively, a scheme is conceivable, in which the number of times of improper secret identification number input attempts made with the IC card put into the input device is temporarily stored in the volatile memory contained in the IC card, and is volatilized and reset when the card is pulled out of the input device. In this case, the number of access times becomes substantially limitless by slipping the IC card into the input device repetitively. This makes ineffective the security of the IC card which is an object of limiting the improper input of the secret identification number.

If a nonvolatile memory such as a ROM is contained in the card instead of the volatile memory and the number of times of improper input attempts is stored into the nonvolatile memory permanently and cumulatively, the history of improper secret identification number input is completely stored. Since the previous number of improper input attempts is recorded, however, the restricted number is quickly reached by the number of newly counted improper input attempts, resulting in an impractical use.

DISCLOSURE OF INVENTION

An object of the present invention is to provide such a practical IC card that the number of times of improper secret identification number input attempts is recorded into a memory which cannot be rewritten or which cannot be easily rewritten and that the IC card is not broken down even if the secret identification number is improperly supplied predetermined times and the IC card can be used again by resetting the number of improper input times.

In accordance with the present invention, therefore, there is provided an IC card having at least control means and storage means, wherein the storage means comprises a storage area for storing information thereon, a secret identification number area for storing a predetermined secret identification number thereon, and an error count area for storing the number of times of improper input of the secret identification number thereon, and wherein the control means comprises comparison means for comparing a supplied secret identification number with the predetermined secret identification number stored on the secret identification number area, error count means for storing the number of times of discrepancy into the error count area when the comparison means indicates discrepancy as a result of comparison, storage area lock means for inhibiting access to the storage area when the error count means has counted a predetermined number of items, and reset means for invalidating the count of the error count area on the basis of at least one specific input signal.

BRIEF DESCRIPTION OF DRAWINGS

FIGS. 5A and 5B show the configuration of FIG. 4 in more detail.

FIG. 6, consisting of (a)–(b), is a logic diagram for illustrating how the number of times of improper input of the secret identification number is recorded into error bits of a segment group in the first embodiment of the present invention.

FIGS. 9A to 9C are flow charts for illustrating the lock cancel of the IC card in the first embodiment of the present invention.

FIGS. 10A to 10C are logic diagrams for illustrating how data are written into reset bits of the segment group in the second embodiment of the present invention.

FIG. 11 is a flow chart for illustrating the execution procedure of the second embodiment according to the present invention.

BEST MODE FOR CARRYING OUT THE INVENTION

Figure 1:
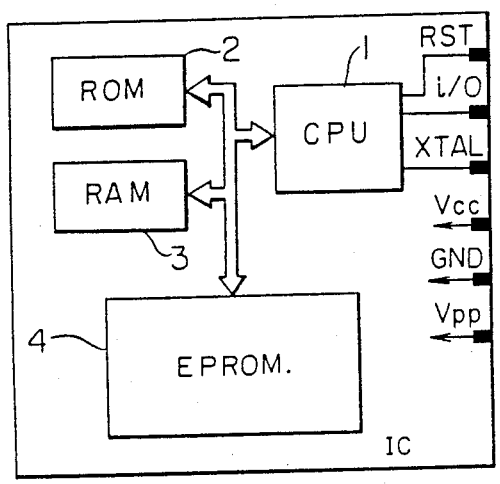
FIG. 1 is a schematic view of an IC card.
Figure 2:
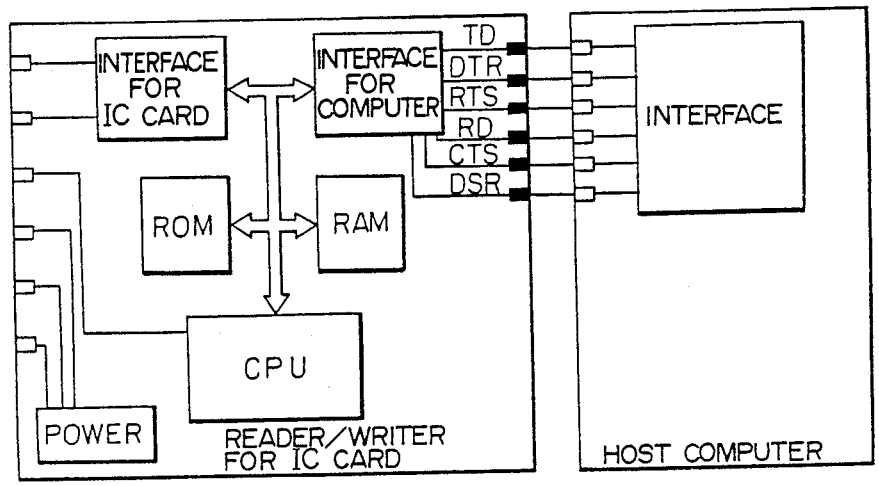
FIG. 2 shows an interface for connecting the IC card to a host computer.

Embodiments of the present invention will be described by referring to annexed drawings. FIG. 1 shows the configuration of an IC card, which includes a control portion (CPU 1) and a memory portion (ROM 2, RAM 3 and EPROM 4). And the IC board is composed of one to several chips of IC. The data stored in the memory portion are accessed through the control portion. FIG. 2 shows an interface (IC card reader/writer) for connecting the IC card to a host computer to use the IC card.

Figure 3:
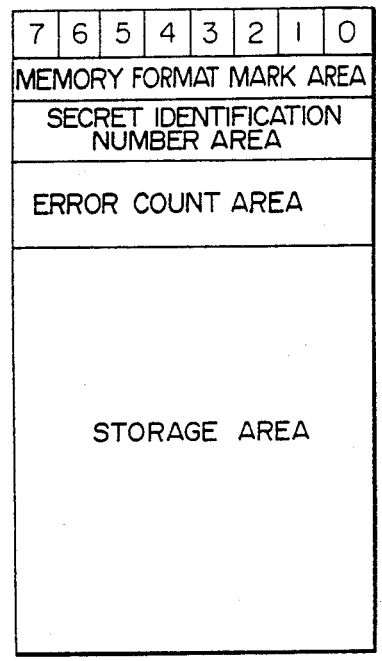
FIG. 3 shows assignment of memory areas on the IC card according to the present invention.

The logic configuration of the memory of the embodiment will now be described by referring to FIG. 3. The memory must have a storage area for storing data, a secret identification number area for storing a secret identification number, and an error count area for storing improper input attempts of the secret identification number. In addition, there is provided a memory format mark area for indicating that the memory has a record.

In order to prevent recorded contents from being altered, the secret identification number area and the error count area are contained in an unwritable memory such as a ROM, or in an ERROM (or EEPROM or RAM) 4 made hardly rewritable by other means such as a program.

The secret identification numbers are divided into individual codes (ID codes) so defined by individuals as not to be easily known by others, organization codes defined in the same way as the individual cards by, for example, banks or companies which issued credit cards, issue codes, and inherent production codes (keys). The secret identification number itself may consist of numeric characters, letters such as alphabetic letters or Japanese alphabets, symbols, or their combination.

The control means includes error count means, storage area lock means, and reset means. The error count means compares the secret identification number stored in the secret identification number area with the entered secret identification number, and counts the number of improper input times by using the error count area when the above described two secret identification numbers are not coincident each other. The storage area lock means inhibits access to the storage area when the counted value has reached a predetermined value. The reset means disables counting in the error count area upon receiving a particular input signal.

Figure 4:
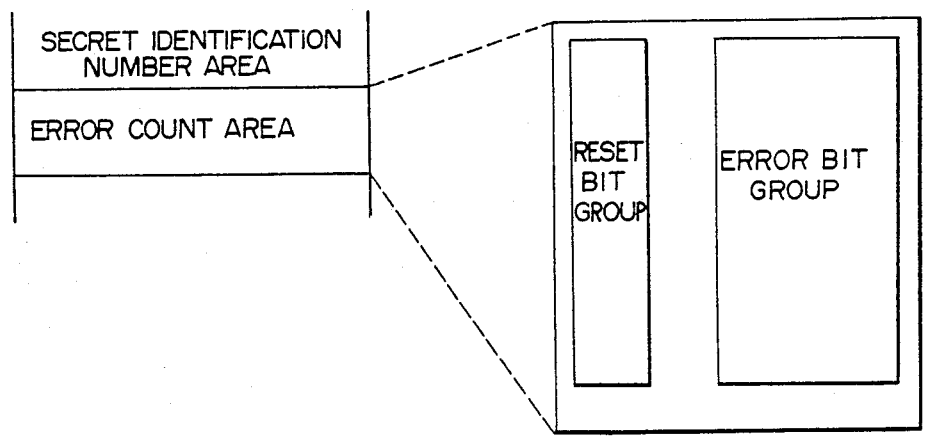
FIG. 4 shows schematic configuration of an error count area included in the memory areas of the memory portion of the IC card according to the present invention.

The error count area for storing the improper input attempts of the secret identification number therein in an embodiment of the present invention will now be described by referring to FIG. 4. In FIG. 4, the error count area contains an error bit group for counting the number of times of improper secret identification number input and a reset bit group written bit by bit each time the count of error bits is reset to be invalidated.

Figures 5A, 5B:
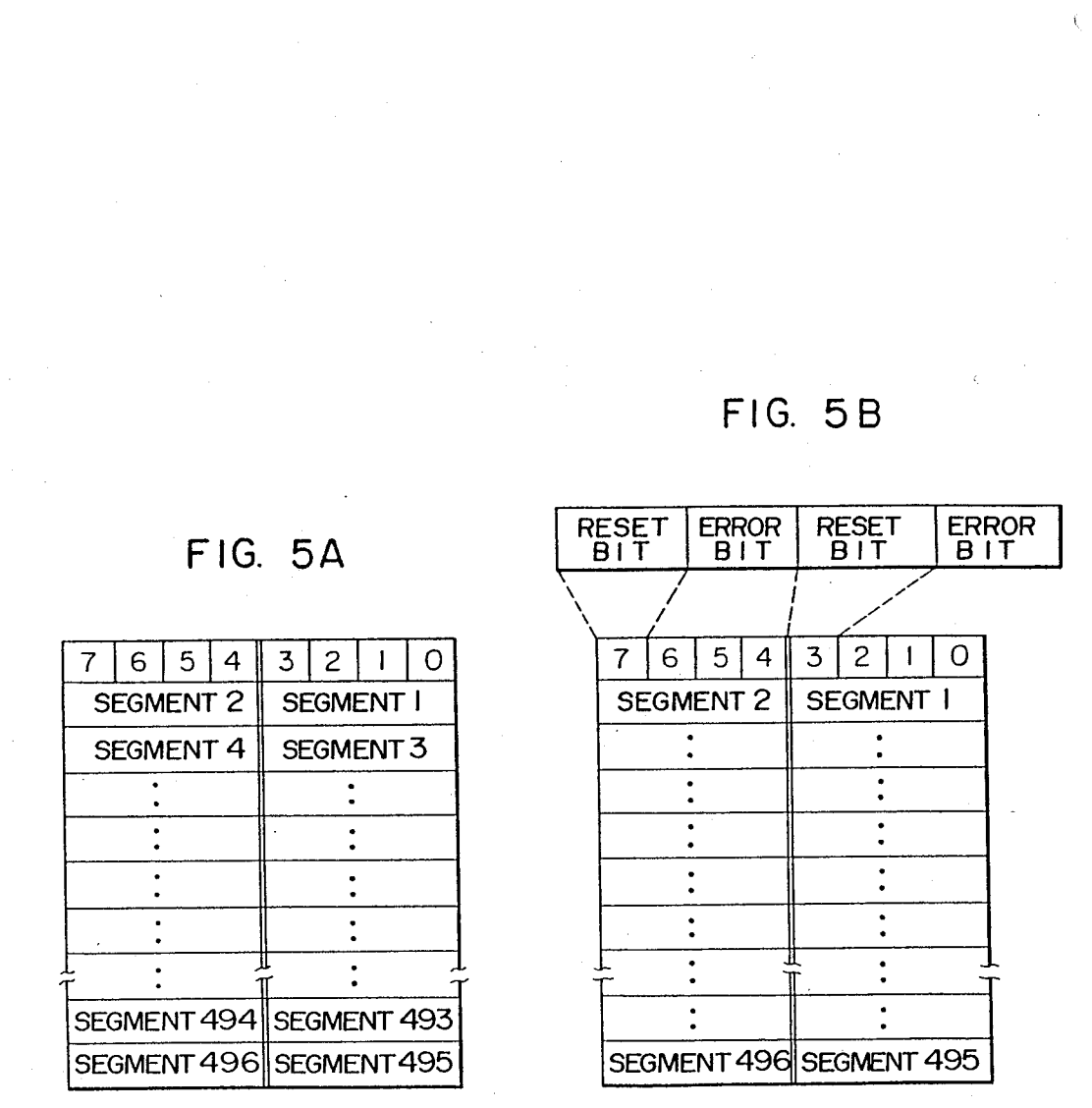

In the error count area, one byte (composed of eight bits) is divided equally into two segments, each of which is composed of four bits as shown in FIG. 5A. As shown in FIG. 5B, three low-order bits of each segment are used as error bits, and one high-order bit of each segment is used as a reset bit. In this embodiment, respective bytes are divided into four-bit segments to produce 496 segments respectively having error bits and reset bits. However, the number of bits in each segment, the number of segments, and their division are not limited to those of the embodiment.

Figure 7:
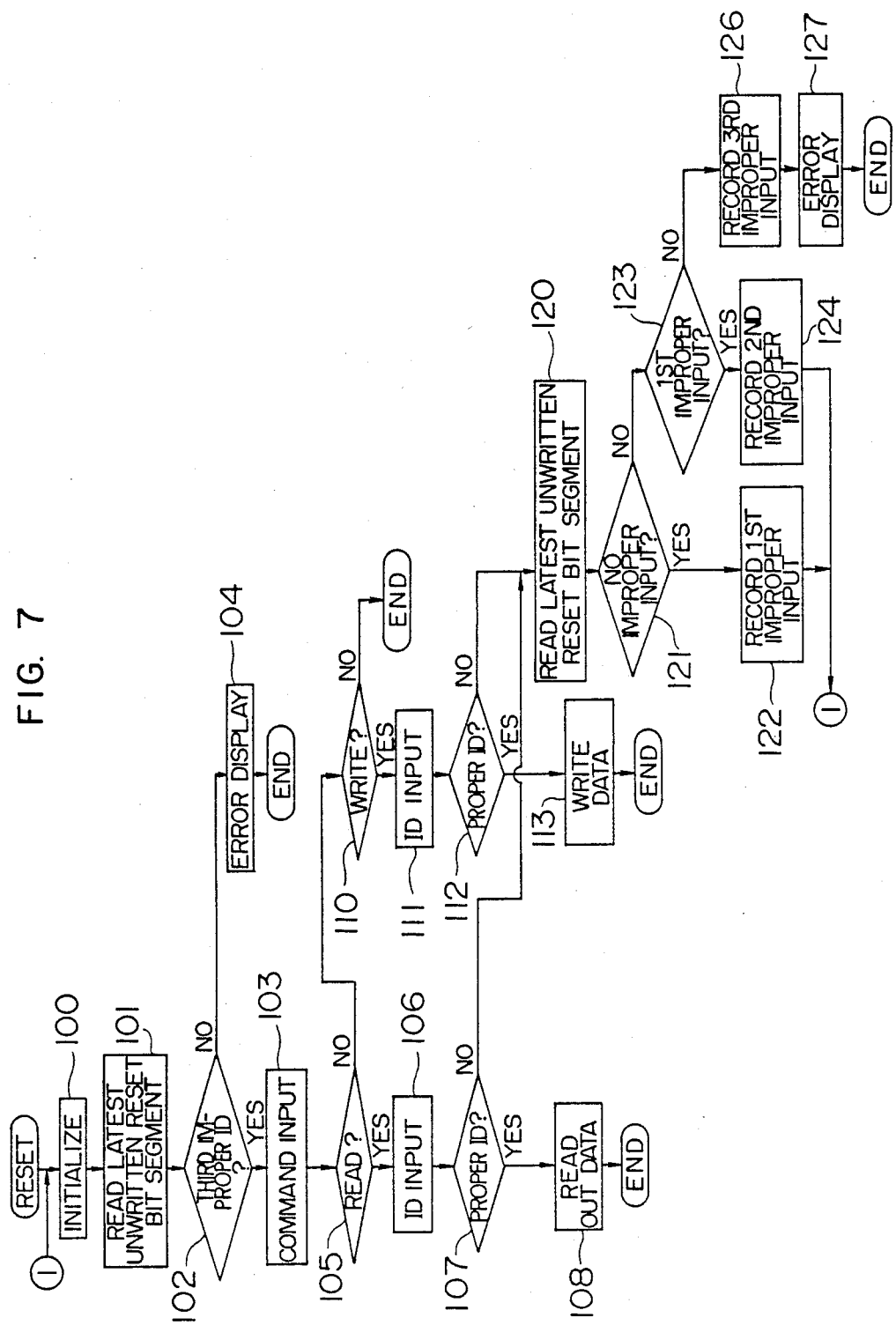
FIG. 7 is a flow chart for recording the number of times of improper input of the secret identification number into the error bits of the segment group in the first embodiment of the present invention.

By referring to the logic diagram of one segment illustrated in FIG. 6 and the flow chart of FIG. 7, the restriction to data access in the above described embodiment upon improper input of the secret identification number will now be described in detail. In the segment of FIG. 6 (a), neither the error bits for the number of improper input times of the secret identification number nor the reset bit are written. All bits of the segment are 1. (Each bit is 1 before the write operation and becomes 0 after the write operation.) If the secret identification number is then improperly supplied, the first improper input is recorded into the least significant writable bit (bit 0) of the error bits. That is to say, the least significant bit (bit 0) change from 1 to zero (FIG. 6 (b)). Upon receiving an improper input of the secret identification number for the second time, the second least significant bit (bit 1) which is the least significant writable bit at that time changes from 1 to 0 (FIG. 6 (c)). Upon receiving an improper input of the secret identification number for the third time, the third least significant bit (bit 2) changes from 1 to 0 (FIG. 6 (d)). Thus, the lock state (1000) is reached, in which unwritten error bits are no longer left in the segment. That is to say, the number of improper input times has reached its allowable limit value.

By referring to a flow chart illustrated in FIG. 7, the operation of FIG. 6 will now be described while following the actual use sequence of the IC card.

At step 100, the IC card is slipped into the I/O device for initialization. At step 101, a segment having the latest unwritten reset bit (reset bit=1) is read out of the error count area. At step 102, it is checked by the I/O device whether three improper input attempts of the secret identification number has been recorded (i.e., whether improper use has been carried out three times). If the number of times of improper input of the secret identification number is less than three (YES), a data read/write command for the IC card is issued at step 103. If the number of times of improper input of the secret identification number has reached three (NO) at step 102, the I/O device displays the error (step 104).

Since the command is issued at step 103, it is determined at steps 105 and 110 whether data are to be read or written. The secret identification number is supplied at step 106 or step 111. At step 107 or step 112, the secret identification number is confirmed. If the supplied identification number is proper, the data are read out at step 108 or the data to be written are supplied at step 113. Thus the processing is ended or step 100 may be resumed. If the supplied secret identification number is determined to be improper at step 107 or step 112, the segment read out at step 101 is read out again at step 120, and it is judged at step 121 whether the previous number of times of improper input is zero or not. If the previous number of times of improper input is zero (YES), i.e., if the current number of times of improper input is one, the improper input is recorded into the least significant error bit of the segment at step 122. The processing is returned to step 100 (or the processing may be ended after displaying the error). If the previous number of times of improper input is not zero at step 121, it is judged at step 123 whether the previous number of times of improper input attempts is one (i.e., the current number of times of improper input attempts is two). If the number is one (YES) at step 123, "0" is written into the second least significant error bit of the segment at step 124. Then the processing is returned to step 100 (or the processing may be ended after displaying the error). If the previous number of times of input is not one (NO), since it has been already determined that the number of times of improper input attempts is less than three times at the step 102, two improper input attempts have been already conducted. Accordingly, "0" is written into the third least significant error bit of the segment at step 126. At step 127, the error is displayed and the processing is ended.

If the number of times of improper input of the secret identification number has reached the allowable limit value, the segment must be shifted for recovering data access by using the IC card again. The segment shift will not be described. For segment #N (1000) having error bits which have already reached the allowable limit as shown in FIG. 8A to be usable again, the reset bit is written as (0000) by using a lock release (unlock) command. The lock release command serves to shift the effective segment to the next segment (#N+1). The lock release surpasses the data read/write function using the normal secret identification number. Before issuing the IC card, the lock release command is recorded in the secret identification number area. The lock release command is different from the normal secret identification number and is a kind of secret identification number. For example, two kinds of keys among the issue number, organization number and the individual number are used as keys for the lock release. Alternatively, one of these keys may also be used.

Figure 8A:
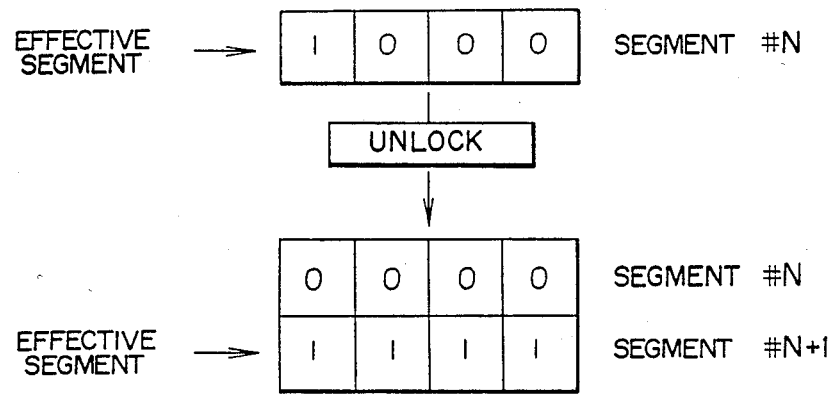
FIGS. 8A to 8D are logic diagrams for illustrating how data are written into reset bits of the segment group in the first embodiment of the present invention.
Figure 8B:
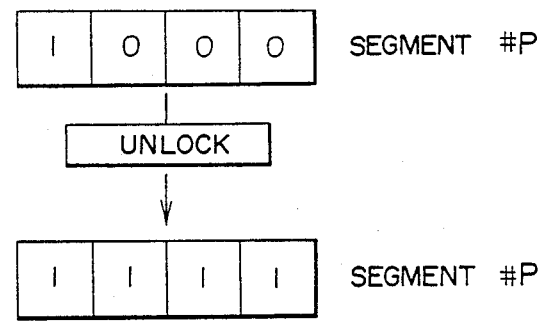

If the error count area is composed of an erasable memory device such as a RAM or EEPROM, the same segment can be changed from the lock state (1000) to the unlocked state (1111) as shown in FIG. 8B. If the error count area comprises an unerasable memory device such as a PROM, however, the effective segment must be shifted from the segment of address #N to the next segment of address #N+1 as shown in FIG. 8A.

Figure 8C:
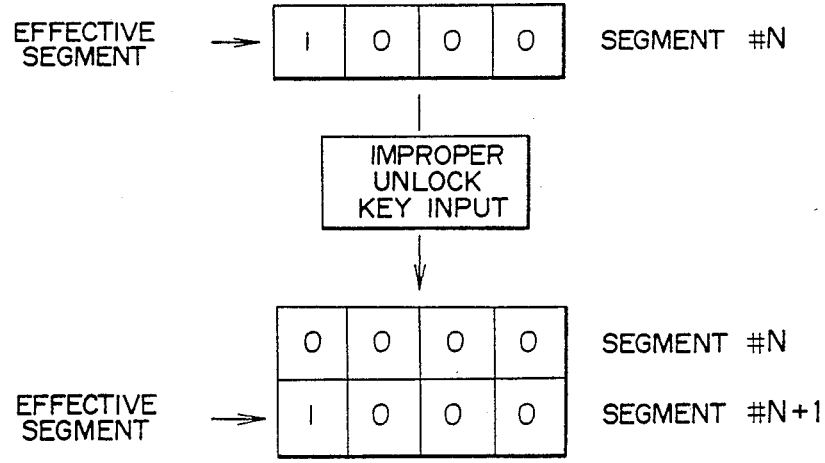

If the key is improperly supplied under the unlocked state, in the embodiment using the EEPROM as illustrated in FIG. 8B, the key is not written in the error count area, but the improper input error is displayed. In the embodiment using the PROM, however, the reset bit is written into the effective segment as illustrated in FIG. 8C, and the next segment is defined as the effective state causing the lock state (1000). that is to say, the IC card cannot be used. In the embodiment using the PROM, the error count area is composed of 496 segments, and the IC card cannot be used again after all segments have undergone write operation. In the embodiment using the EEPROM, however, this restriction is not imposed.

Before the lock of the IC card is released, it must be judged whether the lock was caused by a slip of the card holder's memory or illegal use of a third person. Therefore, strict conditions are imposed on the lock release.

The above described lock release will now be described by referring to a flow chart of FIG. 9A. At step 196, necessary initialization is conducted. The operation according to the flow chart is executed by a special device capable of making the lock release or by inserting it after the step 104 in FIG. 7. At step 197, the segment #N having the latest unwritten reset bit is read out. At step 198, it is checked whether the next segment is the last segment of the error count area or not. If it is the last segment (YES), it is displayed at step 199 that the IC card cannot be used. (This check may be omitted when the RAM or EEPROM is used.) If a space is left in the error count area (NO), the IC card can be used again. At step 200, a command for the lock release is supplied. At step 201, it is confirmed that the lock release command has been supplied. If the answer of step 201 is NO. other processing is carried out at step 202. If the answer of step 201 is YES, the secret identification number such as the individual number and the master code such as the organization number are supplied at steps 203 and 204, respectively. At step 205, it is checked whether the secret identification number and the master code are proper or not. If they are improper (NO), it is displayed that the confirmation result of the secret identification number and the master code are not good, and the processing is ended. If, in this case, the reset bit of the effective segment #N is changed from 1 to 0 and the next segment #N+1 is turned to the lock state (1000) before the end of the processing as shown in FIG. 8C, it becomes possible to record improper key input conducted at the time of lock release. If it is determined at step 205 that the proper secret identification number and master code have been supplied (YES), it is displayed as step 207 that the confirmation result is good, and the segment having the latest unwritten reset bit is read out at step 208. The reset bit is written as (1000→0000) at step 209, and the write operation is confirmed at step 210. If the write operation is confirmed (YES), the end of the lock release is displayed at step 211. If the write operation is not confirmed (NO) at step 210, it is displayed at step 212 that the lock release ended in failure, and the processing is ended.

The steps 203 to 205 may be modified as shown in FIG. 9B. Upon receiving the secret identification number at step 203, it is judged whether the number is proper or not at step 205A. If proper, the master code is supplied at step 204, and it is judged at step 205B whether the master code is proper or not. If proper, the step 207 is taken. If the secret identification number or the master code is determined to be improper at step 205A or 205B, it is displayed at step 206 that the IC card cannot be used.

Figure 8D:
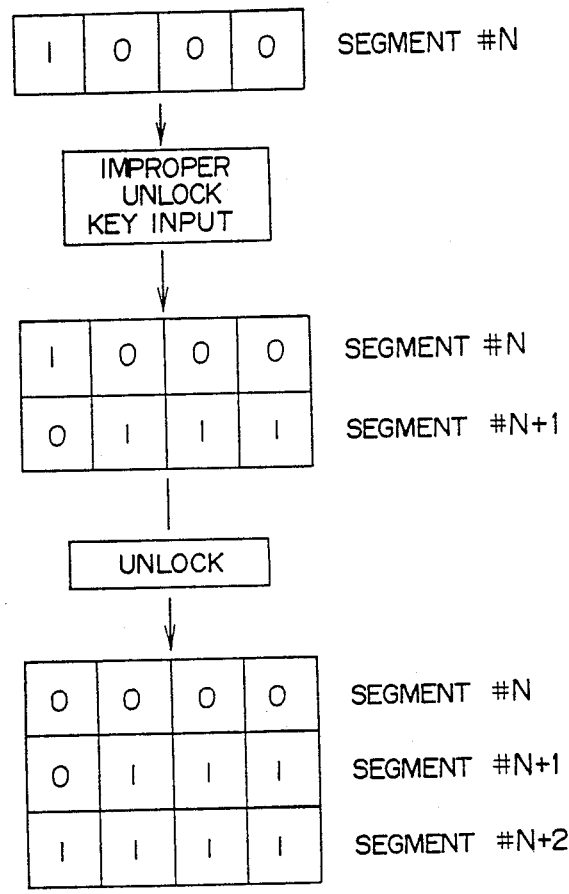

Moreover, when lock release is ended in failure, as shown in FIG. 8D, "0" is set to a reset bit in the most upper order segment (segment #N+1 in the case) of effective segments following the segment #N which is in lock. If the correct key is inputted at the following unlock operation, the segment #N in lock is set to (0000) to be in unlock. Thereafter, if improper secret identification number is supplied, a first segment (segment #N+2 in the case) having a reset bit of "1" counts the number of times of the improper secret identification number. By so doing, improper input of unlock key is stored into the error count area in the manner that the lock release failure is distinguished from improper secret identification number inputs. This operation can be executed by inserting step 206A between steps 205 and 206 in FIG. 9A, as shown in FIG. 9A.

In this embodiment, the segment having the latest unwritten reset bit is read out of the error count area. If the number of times of improper input of the secret identification number is less than three, data access is allowed. If the number of times of improper input of the secret identification number has reached three, the error is displayed and the IC card is made unusable. When the IC card is to be usable again, the reset bit is changed from 1 to 0 and the effective segment is shifted to a new segment. Thus, the secret identification number can be entered and data access is allowed again.

The allowable number of times of error occurrence has been defined to be 3 as an example. It is a matter of course that any number of times can be chosen depending upon the layout of the error count area.

The second embodiment of the present invention will now be described. If the IC card is accessed and the proper secret identification number is supplied in this embodiment after the improper input of secret identification number has been recorded into the segment once (1110) or twice (1100) as shown in FIG. 10B or 10C, the effective segment is shifted to the next segment. Since the shifted effective segment has bits 1111, the number of times of discrepancy between secret identification numbers becomes zero and it is not accumulated. That is to say, the constant allowable number of times of improper input is always assured.

When the proper secret identification number is supplied in the second embodiment even if the number of times of improper input has been written into error bits, "0" is written into the reset bit and the effective segment is shifted to a new segment. As a result, the number of times of improper input can be counted from zero.

FIG. 10A is a logic diagram of a segment which has been supplied with the proper secret identification number from the beginning. Even after the key operation, the segment #N takes the form of (1111). It is a matter of course that the segment #N has no error bits recorded. In case of FIG. 10B, the proper secret identification number is supplied after the secret identification number has been improperly supplied once as represented by the bit pattern (1110). The effective segment is shifted from the segment #N to the next segment #N+1. That is to say, as the logic operation to the segment before shift, the reset bit is written into the segment #N to form the bit pattern (0110), and the error bit counting in the segment #N is inhibited. Then the next segment #N+1 counts the improper input attempts. Bit "0" is written into the reset bit located at the most significant bit position of the segment, and the effective segment is shifted from the segment #N to the next segment #N+1. Although the segment #N before the shift operation may have bit pattern (0000), it is possible to leave the improper input record by adopting the bit pattern (0110).

FIG. 10C shows a case where the proper secret identification number is supplied after the secret identification number has been improperly supplied twice as represented by the bit pattern (1100). The effective segment is shifted from the segment #N to the next segment #N+1 having no error written therein. Thus an improper input can be written into new error bits.

Although the bit pattern of the segment #N may also be defined as (0000), it becomes possible to leave the record of improper input attempts by adopting the bit pattern (0100).

By referring to a flow chart of FIG. 11, the above described second embodiment will now be described in accordance with the actual use sequence of the IC card. Steps 100 to 127 are similar to those of the first embodiment. If the proper input of the secret identification number is confirmed at step 107 or step 112, data readout or write data input is conducted at step 108 or step 113. Thereafter, the segment read out at step 101 is read out again at step 150. Based on the segment thus read out, it is judged at step 151 whether the number of times of improper input is zero or not. If the number of times is determined to be zero, processing is returned to step 100. If the number of times is determined not to be zero, the reset bit is written at step 152 so that the segment will have the bit pattern (0110) (when the secret identification number was improperly supplied once) or the bit pattern (0100) (when the secret identification number was improperly supplied twice). Then the processing is ended. Even if the segment has an improper input record, it is thus possible to shift the effective segment to a segment having no improper input records by supplying the proper secret identification number. If the number of times of improper input of the secret identification number has reached three, however, the answer at step 102 is NO, step 104 being taken. Thus the IC card gets in the lock state. Even if the proper secret identification number is supplied, therefore, the lock state cannot be released. In this case, the segment must be shifted in accordance with the lock release described with reference to the first embodiment.

Even if there has been a record of improper input of the secret identification number (once or twice), the record is prevented from being accumulated in the second embodiment by supplying the proper secret identification number. Thus, it is possible to provide an IC card which is practical with respect to improper input of the secret identification number caused by a mistake or the like of the IC card holder.

The third embodiment of the present invention will now be described. In this embodiment, the error count area is provided in a writable and erasable memory such an EEPROM. The area count area is composed of one segment having only three error bits.

The principle of the third embodiment will now be described by referring to FIGS. 12 and 13.

Figure 12:
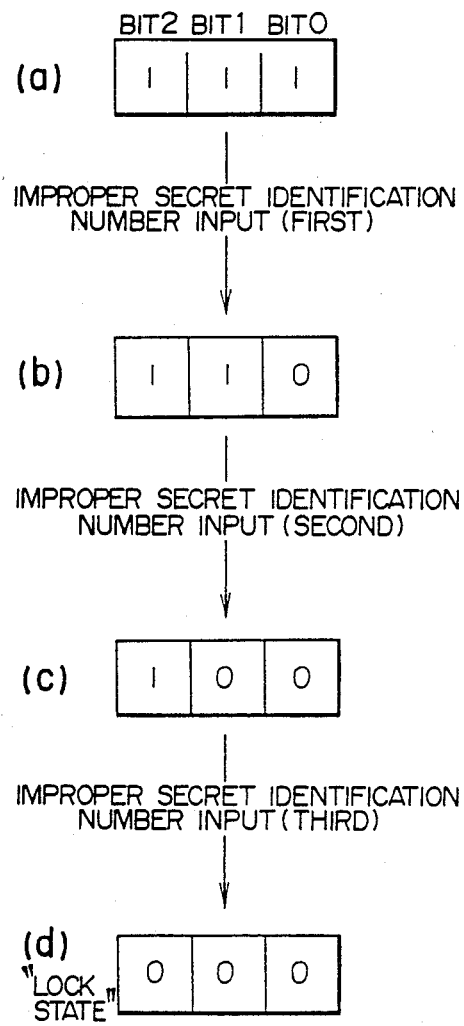
FIG. 12, consisting of (a)–(d), is a logic diagram for illustrating the third embodiment according to the present invention.

FIG. 12 (a) shows a segment wherein the number of times of improper input has not yet written. The segment has a bit pattern (111). Upon receiving the secret identification number improperly supplied, the error bit (bit 0) located at the least significant bit position is inverted from 1 to 0 as shown in FIG. 12 (b). Upon receiving the improper input for the second time, the error bit (bit 1) located at the second least significant writable bit position is inverted from 1 to 0 as shown in FIG. 12 (c). Upon receiving the improper input for the third time, the third least significant error bit (bit 2) is inverted from 1 to 0 in the same way as shown in FIG. 12 (d). In this state, unwritten error bits are not left, the allowable limit of improper input being reached. This state is defined as the lock state.

In the third embodiment, the number of times of improper input may be accumulatively counted up to the lock state in the same way as the first embodiment even if the proper secret identification number is supplied before the lock state is reached. Alternatively, the number of times of improper input counted till then may be reset in the same way as the second embodiment if the proper secret identification number is supplied before the lock state is reached. The third embodiment applied to the latter case is illustrated in FIG. 13. Since the fundamental concept of FIG. 13 is the same as that of FIG. 11, steps of FIG. 13 corresponding to those of FIG. 11 are designated by like symbols.

Figure 13:
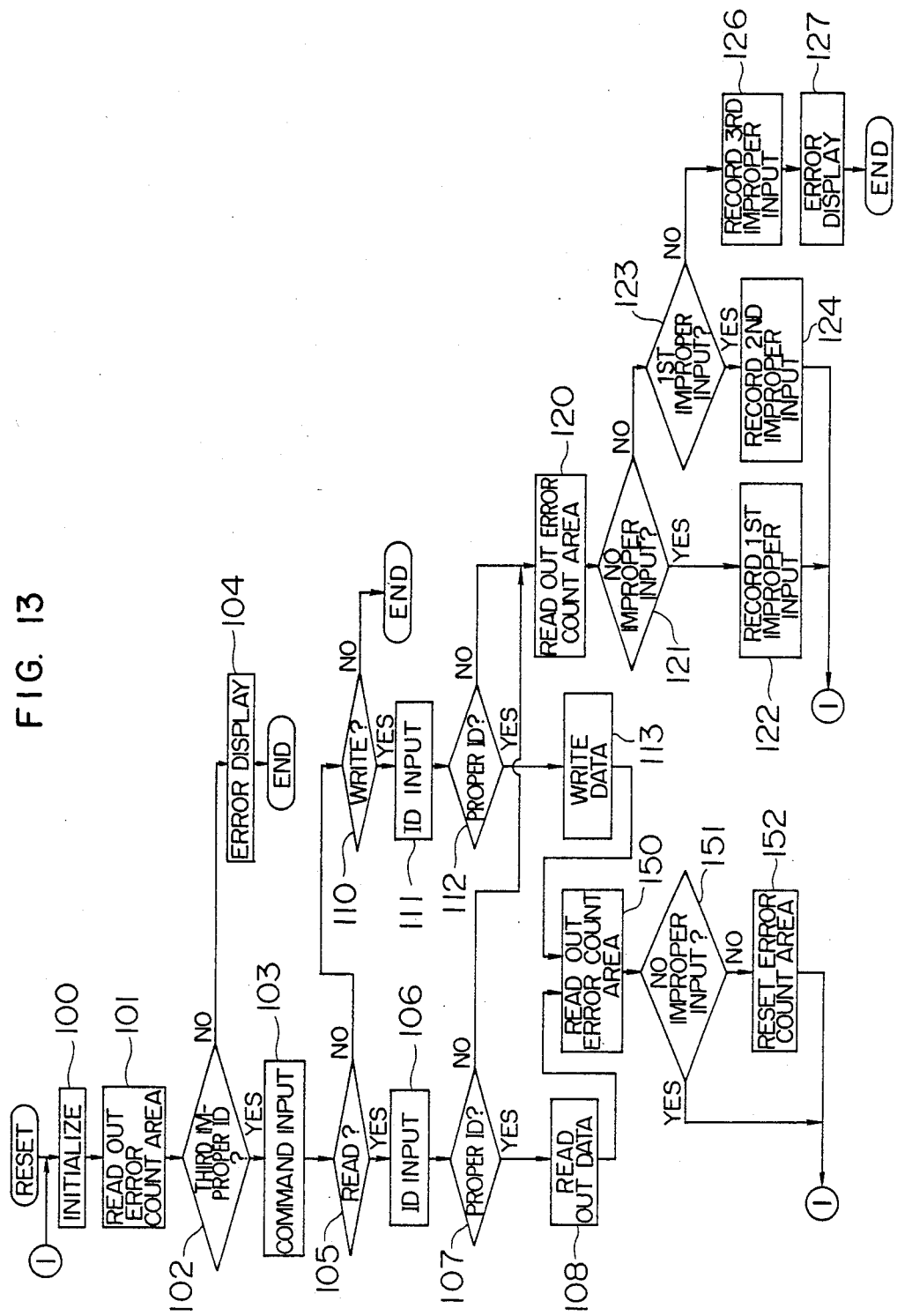
FIG. 13 is a flow chart for illustrating the execution procedure of third embodiment according to the present invention.

At step 100 of FIG. 13, initialization is conducted by slipping the IC card into the I/O device. At step 101, the error count area is read out. At step 102, it is judged whether the number of times of improper input of the secret identification number is less than three. If the answer of step 102 is NO, the error is displayed at step 104. If the answer of step 102 is YES, the read command or write command is supplied at step 103. Subsequently, it is judged at step 105 whether the read command has been supplied or not. And it is judged at step 110 whether the write command has been supplied or not. If the answer of step 105 is the read command, steps 106, 107 and 108 are executed to reach step 150. If the answer of step 110 is the write command, steps 111, 112 and 113 are executed to reach step 150.

At step 150, the error count area read out at step 101 is read out again. Based on this error count area, it is judged at step 151 whether the number of times of improper input is zero or not. If the number is determined to be zero at step 151, processing is returned to step 100 or ended. If it is determined at step 151 that the number is not zero but one (110) or two (100), a reset signal is issued from reset means of the control means to return the error count area to its initial state (111) at step 152. When the IC card is accessed next time, the number of times of discrepancy between secret identification numbers becomes zero, and the number of times of discrepancy is not accumulated.

If the supplied secret identification number is determined to be improper at step 107 or 112, the error count area is read out again at step 120. On the basis of the error bit state of the error count area, the number of times of improper input is determined to be 0, 1 or 2 at step 121, 123 or 125, respectively. According to the determined result, the improper input of the first time, the second time, or the third time is written into the error count area at step 122, 124 or 126, respectively. After the input of the third time has been written into the error count area at step 126, the error display is executed at step 127. Even if the access to the IC card is attempted thereafter, only the error display is effected at steps 102 and 104 and the access is not allowed. Accordingly, the illegal use of the IC card can be prevented.

Figure 14:
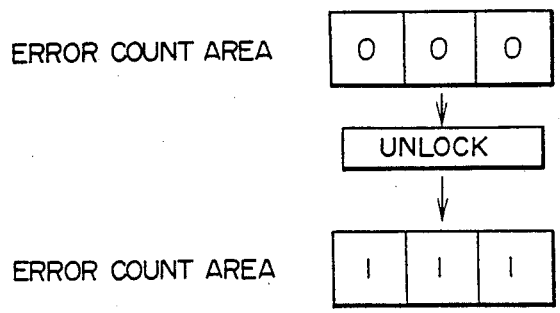
FIG. 14 is a logic diagram for illustrating the lock cancel of the third embodiment according to the present invention.

When the error count area of the third embodiment has reached its lock state (000), it is possible to release the lock and return the error count area to its initial state (111) as shown in FIG. 14 (b) by the unlock operation. Thus the IC card can be used again. The unlock operation will now be described by referring to FIG. 15.

Figure 15:
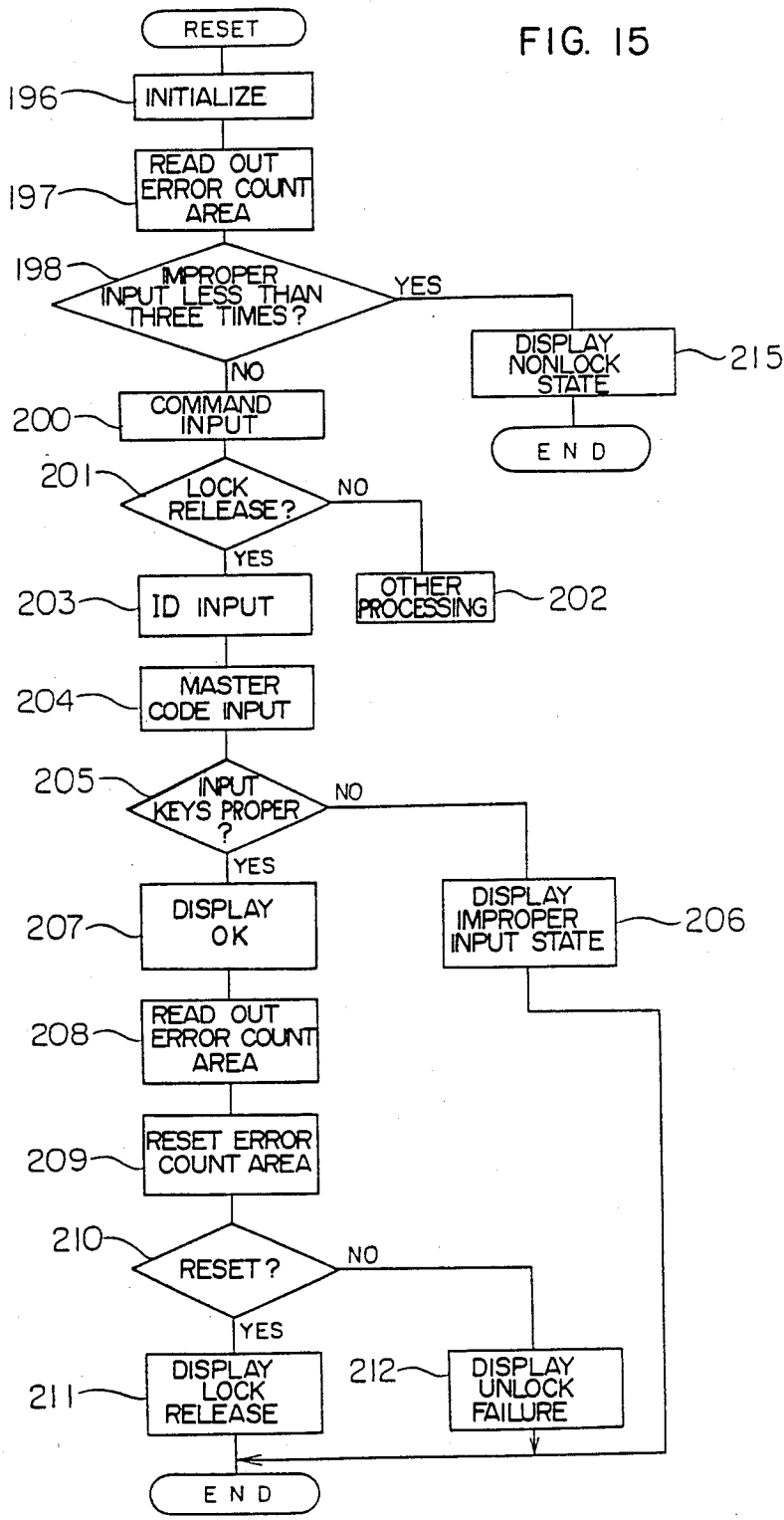
FIG. 15 is a flow chart for illustrating the lock cancel procedure in the third embodiment of the present invention.

Since the lock release in the third embodiment is based on the same concept of the first embodiment, steps of FIG. 15 corresponding to those of FIG. 9A of the first embodiment are designated by like symbols.

In FIG. 15, initialization is at first conducted at step 196. Subsequently at step 197, the error count area is read out. At step 198, it is judged whether the number of times of improper input is less than three or not. If the answer of step 198 is YES, it is displayed at step 215 that the IC card is not in the lock state, and the processing is ended. If the answer of step 198 is NO, the IC card is in the lock state. Therefore, the lock release command is supplied at step 200, and it is confirmed at step 201 that the lock release command has been supplied. If the answer of step 201 is NO, other processing is carried out. If the answer of step 201 is YES, the necessary secret identification number and master code are supplied at steps 203 and 204. It is judged at step 205 whether the secret identification number and the master code are proper or not. If the answer of step 205 is NO, it is displayed at step 206 that the secret identification number and/or master code are improper, and the processing is ended. If it is determined at step 205 that the secret identification number and the master code are proper, the error count area undergoes reset processing to have a bit pattern (111) at steps 207, 208 and 209. At step 210, the completion of the reset processing is confirmed. If the answer of step 210 is YES, the completion of the unlock operation is displayed at step 211. If the answer of step 210 is NO, it is displayed at step 212 that the unlock processing fails.

In FIG. 15, two keys are supplied at steps 203 and 204, and thereafter it is judged at step 205 whether the supplied keys are proper or not. Alternatively, it may be judged whether the key is proper or not each time the key is supplied as shown in FIG. 9B. Further alternatively, it is possible to replace "SUPPLY COMMAND" of step 200 by "SUPPLY MASTER CODE" and replace "LOCK RELEASE?" of step 201 by "MASTER CODES IS CONFIRMES". In this case, step 204 is omitted, and only the secret identification number is confirmed at step 205. This modification may also be applied to FIG. 9A in the same way. Further in FIG. 15, two keys consecutively supplied at steps 203 and 204 may be regarded as one secret identification number as a whole. However, it is also possible to omit step 204 and use only the master code as the secret identification number. This modification may be applied to FIG. 9A in the same way.

When it is desired to leave the record of improper input of the secret identification number in the third embodiment, it is attained in step 152 of FIG. 13 by letting the internal memory of the IC card or an external host computer accumulate the number of times of improper input recorded in the error count area and thereafter issuing the reset signal to reset the error count area.

Figure 16:
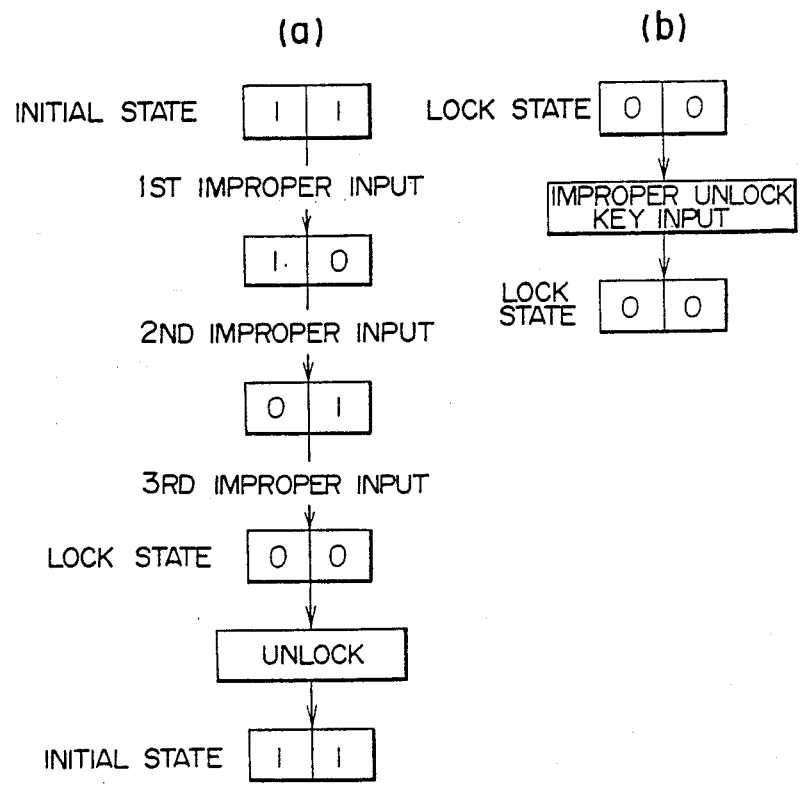
FIG. 16(*a*) and (b) or a logic diagram for illustrating the fourth embodiment of the present invention.

FIG. 16 shows the fourth embodiment of the present invention. In the fourth embodiment, an erasable memory such as an EEPROM is used, and the error count area is composed of one segment having only two error bits. Two bits of this embodiment represent two digits of a binary number. As shown in FIG. 16 (a), the initial state (wherein the number of times of improper input is zero) is represented by (11). The improper input of the first time, the second time, and the third time are represented by (10), (01), and (00), respectively. That is to say, the lock state is represented by (00). If a predetermined key necessary for unlocking is supplied under the lock state, the error count area is returned to the initial state and the lock is released to make the card usable. If the key necessary for unlocking is improperly supplied, however, the lock state is maintained as shown in FIG. 16 (b).

Since the fourth embodiment can be carried out in accordance with FIGS. 13 and 15, duplicate explanation will be omitted.

What is claimed is:

1. An IC card having at least control means and storage means, wherein said storage means comprises:
   a storage area for storing information thereon;
   a secret identification number area for storing at least one predetermined secret identification number thereon; and
   an error count area for storing the number of times of improper input of the secret identification number thereon, and wherein said control means comprises:
   comparison means for comparing a supplied secret identification number with said predetermined secret identification number stored on said secret identification number area;

means for accessing said storage area when said comparison means indicates coincident as a result of comparison;

error count means for storing the number of times of discrepancy into said error count area when said comparison means indicates discrepancy as a result of comparison;

storage area lock means for inhibiting access to said storage area when said error count means has counted a predetermined number of time; and unlock means for invalidating the count of said error count area to release said storage area lock means, on the basis of at least one specific input signal after the count of said error count area has counted said predetermined number.

2. An IC card according to claim 1, wherein the count of said error count area is invalidated after said storage area access means has been executed on the basis of the input signal of said predetermined secret identification number.

3. An IC card according to claim 1, further comprising means for allowing access to said storage area after the count of said error count area has been invalidated on the basis of said specific input signal.

4. An IC card according to claim 1, wherein said error count area includes a plurality of segments capable of counting the improper inputs up to said predetermined number, wherein said unlock means includes means for invalidating a segment currently used for counting, and wherein said error count means includes means for making one predetermined segment among said plurality of segments which is not yet invalidated count improper inputs.

5. An IC card according to claim 4, wherein each of said segments includes error bits for counting improper inputs in conjunction with said error count means and a reset bit for invalidating said segment by said reset means.

6. An IC card according to claim 5, wherein said error bits comprise a plurality of bits and said error count means includes means for successively inverting said error bits bit by bit each time an improper input is supplied.

7. An IC card according to claim 5, wherein said unlock means includes means for invalidating said segment by inverting said reset bit.

8. An IC card according to claim 1, wherein said error count area is disposed in a rewritable memory.

9. An IC card according to claim 8, wherein said unlock means includes means for returning said error count area to its initial state having no count of improper input.

10. An IC card according to claim 9, wherein said error count means includes means for successively inverting said error count area bit by bit each time an improper input is supplied.

11. An IC card according to claim 9, wherein said error means includes means for effecting binary count using said error count area.

12. An IC card according to claim 1, further comprising means for invalidating the count of said error count area, on the basis of the input signal of said predetermined secret identification number, when the count of said error count area is less than said predetermined number.

13. An IC card according to claim 1, wherein said unlock means releases said storage area lock means on the basis of said specific input signal and the input signal of said secret identification number.

* * * * *